United States Patent [19]

Bellis et al.

[11] Patent Number: 4,772,322

[45] Date of Patent: Sep. 20, 1988

[54] PRODUCTION OF FLAT PRODUCTS FROM PARTICULATE MATERIAL

[76] Inventors: John Bellis, 10 Larchwood Road, Borras Park, Wrexham, Clywd; Nigel J. Brooks, 32 Woodland Drive, Greenfield, Holywell, Clywd, both of Wales

[21] Appl. No.: 52,687

[22] Filed: May 20, 1987

[30] Foreign Application Priority Data

May 20, 1986 [GB] United Kingdom ................. 8612267

[51] Int. Cl.[4] ........................................... C22C 29/00
[52] U.S. Cl. ........................................ 75/230; 75/228; 264/109; 264/123; 264/124; 419/3; 419/36; 419/37; 419/40; 419/65
[58] Field of Search .................... 419/3, 40, 36, 37, 65; 264/109, 123, 124; 75/228, 230

[56] References Cited

U.S. PATENT DOCUMENTS

| | | | |
|---|---|---|---|
| 3,335,000 | 8/1967 | Bliss | 419/40 |
| 3,403,999 | 10/1968 | Bliss | 419/40 |
| 3,653,884 | 4/1972 | Davies et al. | 75/214 |
| 3,658,517 | 4/1972 | Davies et al. | 75/200 |
| 3,702,511 | 11/1972 | Miller | 40/306 |
| 3,720,511 | 3/1973 | Davies et al. | 75/214 |
| 3,839,026 | 10/1974 | Gibbon et al. | 75/214 |
| 4,592,780 | 6/1986 | Davies et al. | 75/229 |
| 4,596,746 | 6/1986 | Morishita et al. | 419/40 |
| 4,602,954 | 7/1986 | Davies et al. | 75/232 |
| 4,617,054 | 10/1986 | Mathers | 75/246 |
| 4,622,189 | 11/1986 | Bellis et al. | 264/112 |

*Primary Examiner*—Stephen J. Lechert, Jr.
*Attorney, Agent, or Firm*—Kinney & Lange

[57] ABSTRACT

A process for producing flat products from particulate material comprises the steps of forming relatively smooth, castable slurry comprising a suspension of particulate material in an aqueous solution, a film-forming binder material and a dispersion of a particulate synthetic resin in an aqueous solution, depositing a coating of this slurry onto a support surface and, heating the deposited coating to a temperature at which a component of the synthetic resin volatilises. The coating may be removed from the support surface as a flat product either before or after heating to volatilize a component of the synthetic resin.

22 Claims, No Drawings

PRODUCTION OF FLAT PRODUCTS FROM PARTICULATE MATERIAL

BACKGROUND OF THE INVENTION

1. Field of the Invention

This invention relates to a process of producing flat products from particulate material and to flat products produced by such a process. By the term "flat products" is meant products in strip, sheet or like form or products produced therefrom which have retained a generally flat appearance.

2. Description of the Prior Art

A process for the production of strip from metal powder is known in which a suspension of powdered metal in a solution of a film-forming binder material in water is coated in the form of a slurry onto a support surface, dried and removed from the support surface, rolled and sintered to produce a metal strip. While this process has been employed successfully to produce a broad range of strip products, only limited success has been achieved in producing thin flexible unsintered strips of materials which can be employed in applications where the properties of enhanced flexible strength, water resistance and an ability to retain a stable form in hostile environments are a pre-requisite. The present invention sets out to provide a process by which such products can be produced.

SUMMARY OF THE INVENTION

According to the present invention in one aspect, there is provided a process for producing flat products from particulate material which comprises forming a relatively smooth, castable slurry comprising a suspension of particulate material in a liquid solution, a film-forming binder material and a dispersion of a particulate synthetic resin in a liquid solution, depositing a coating of this slurry onto a support surface and, heating the deposited coating to a temperature at which a component of the synthetic resin volatilises.

The coating may be removed from the support surface as a flat product either before or after heating to volatilise a component of the synthetic resin. Further the coating may be cooled before being removed from the support surface. Preferably, the coating is cooled to a temperature of below 100° C.

DETAILED DESCRIPTION OF THE PREFERRED EMBODIMENTS

In one embodiment of the invention, the deposited coating is heated to a temperature at which the resin coalesces. Alternatively, the coating may be heated to a temperature above that at which a component of the synthetic resin volatilises and below that at which coalescence of the resin occurs.

Preferably, the dispersion of a particulate resin in a liquid solution is added to an initially formed slurry of the suspension of particulate material in a liquid solution and the film-forming binder material. The liquid is preferably water.

The particulate material may comprise a metallic powder, a non-metallic powder or a mixture of such powders. The particulate material may be magnetic or non-magnetic. In one particular embodiment, the particulate material consists of a blend of nickel hydrate and graphite powders.

In still further embodiments, the material comprises a particulate abrasive material, e.g. diamond powder or a super-conducting material, e.g. a titanium or niobium alloy or a metal-ceramic or ceramic material having super conducting properties.

The film-forming binder material preferably comprises methyl cellulose. A plasticiser may be added to the slurry; typically, the plasticiser comprises polyethylene glycol or glycerol.

The synthetic resin preferably comprises a fluorinated polymer such as polytetrafluoroethylene. In this case, the deposited coating is heated to a temperature in the range 230° C. to 260° C. to effect volatisation of a component of the synthetic resin or to a temperature in excess of 260° C. if partial coalescence is required, or to a temperature of between 355° C. and 400° C. if full coalescence is to be achieved. Alternative synthetic resins which may be employed include polyvinylchloride, and a butyl rubber dispersion in water. Other polymers which can be dispersed or otherwise incorporated into a slurry and which can be made into a coherent film by heat treatment may be employed.

The thin, flexible flat product may be rolled to effect compaction either before or after heating to a temperature at or above that at which a resin component volatilises. Additionally, or alternatively, a flexible flat product of the process may be bonded to one or both sides of a preformed flat product of metallic and/or non-metallic material. Such bonding may be effected mechanically by feeding the flat products in interfacial contact into the nip of a pair of compaction rolls. At least one of the flat products may be subjected to back tension during compaction.

In one embodiment of the invention, a thin flexible flat product consisting essentially of nickel hydrate and graphite is bonded to one or each side of a porous nickel flat product by passing the individual strips while in interfacial contact between the nip of a pair of compaction rolls. The porous nickel material may be subjected to a degree of back tension during the bonding process. The mechanically bonded flat products may be subjected to a second compaction to enhance the mechanical bond.

According to the present invention in a further aspect there is provided a process for producing flat products from particulate material which comprises forming a castable slurry comprising, in a liquid solution, particulate metallic and/or non-metallic material, a film-forming binder and a synthetic resin in particulate form, depositing the slurry as a coating onto a support surface and heating the deposited coating to a temperature at or in excess of that at which a component of the synthetic resin volatilises. The coating may subsequently be cooled and then removed from the support surface as a thin flexible flat product.

According to the present invention in a still further aspect there is provided a thin, flexible flat product comprising metallic and/or non-metallic particulate material contained in a synthetic resin matrix.

The invention will now be described by way of example only with reference to the following description and Example in which a thin flexible strip was produced from a blend of nickel hydrate and graphite powders and is bonded mechanically to one or both sides of a thin porous strip of nickel.

In order to produce samples which do not dissolve and lose their original shape/dimension when submerged in water, slurries comprising a mix of the powder blend and various quantities of a dispersion of particulate polytetrafluoroethylene in water were produced. In each case, the resultant mix tended to coagulate to form a rubber-like lumpy consistency which could not efficiently be cast onto a support surface. Addition of water both before and after the addition of the dispersion of particulate polytetrafluoroethylene did not prove to be beneficial.

It was only after a controlled amount of methyl cellulose was added to the slurry that the coagulant content of the slurry was dispersed to produce a slurry which could properly be cast. It was found that the addition of the methyl cellulose in advance of the addition of the dispersion of particulate polytetrafluoroethylene produced no coagulation until the latter was added to excess.

Further slurry mixes were produced so that a suitable slurry composition for subsequent processing could be established. Typically, the ratio of particulate material to water of the initially formed slurry was found to lie in the range of 3.4:1 and 4.2:1 for metallic materials and 0.6:1 and 0.74:1 for a slurry containing a mix of nickel hydrate powder blended with a graphite powder.

Typically, the dispersion of particulate polytetrafluoroethylene comprised an aqueous solution containing approximately 60% polytetrafluoroethylene by weight. Typically, 160 mls of this dispersion was required for each kilogram of particulate material employed.

After drying strip samples produced from the slurry at normal drying temperatures of approximately 150° C., the samples proved to be handleable but still fairly brittle. However, on heating to a temperature in the range 230° C. to 260° C., a component of the polytetrafluoroethylene dispersion volatised. Partial coalescence of the polytetrafluoroethylene may also have occurred. On cooling from this temperature range, the samples were found to have adequate flexibility and to retain their shape/dimensions when submerged in water with no apparent dissolution occurring.

EXAMPLE

A slurry comprising a mix of nickel hydrate powder blended with a graphite powder, a controlled quantity of methyl cellulose and a dispersion of polytetrafluoroethylene was produced by the method described above, cast onto a support surface and heated to a temperature in the range 230° C. to 260° C. The dried product was removed from the support surface in this strip form. At this stage, the gauge of the strip was approximately 1 to 2 millimeters.

Some samples of the thin, flexible strip produced were then compacted by themselves and others compacted in interfacial contact with each side of a strip of porous nickel. In the latter case, the gauge of the nickel strip at this stage was approximately 0.004". The compaction load applied was found to be important in that insufficient loading produced a weak mechanical bond whilst excessive loading caused the product to break up in the mill.

A tendency for creasing of the strips to occur as they passed through the mill was overcome by applying a controlled back tension to the nickel strip during roll compaction.

One other example of a strip produced by the process described is a nickel hydrate/graphite strip subsequently bonded to a strip of perforated nickel.

It is to be understood that the Example and accompanying description is merely exemplary of the invention and that various modifications or compositioned changes may be affected without departing from the true scope of the invention.

Thus a wide range of particulate material may be employed to produce strips of a variety of physical and chemical properties. Thus, the particulate material may have magnetic or non-magnetic properties; it may be metallic or non-metallic; it may have high or low hardness charateristics (e.g. the material may comprise diamond powder if good abrasive characteristics are, for example, required; or it may be a super-conducting material of a metallic (e.g. a titanium or niobium alloy), metal ceramic or ceramic material.

We claim:

1. A process for producing flat products from particulate material which comprises forming a relatively smooth, castable slurry comprising a suspension of particulate material in a liquid solution, a film-forming binder material and a dispersion of a particulate synthetic resin in a liquid solution, depositing a coating of this slurry onto a support surface and, heating the deposited coating to a temperature at which a component of the synthetic resin volatilises.

2. A process as claimed in claim 1 wqherein the castable slurry comprises a suspension of particulate material in an aqueous solution.

3. A process as claimed in claim 1 wherein the coating is removed from the support surface as a flat product either before or after heating to volatilise a component of the synthetic resin.

4. A process as claimed in claim 3 wherein the coating is cooled before being removed from the support surface.

5. A process as claimed in claim 4 wherein the coating is cooled to a temperature of below 100° C.

6. A process as claimed in claim 1 wherein the deposited coating is heated to a temperature at which the resin coalesces.

7. A process as claimed in claim 1 wherein the coating is heated to a temperature above that at which a component of the synthetic resin volatilises and below that at which coalescence of the resin occurs.

8. A process as claimed in claim 1 wherein the dispersion of a particualte resin in a liquid solution is added to an initially formed slurry of the suspension of particulate material in a liquid solution and the film-forming binder material.

9. A process as claimed in claim 1 wherein the particulate material comprises a metallic powder, a non-metallic powder or a mixture of such powders.

10. A process as claimed in claim 1 wherein the particulate material consists of a blend of nickel hydrate and graphite powders.

11. A process as claimed in claim 1 wherein the particulate material consists of diamond powder.

12. A process as claimed in claim 1 wherein the film-forming binder material comprises methyl cellulose.

13. A process as claimed in claim 1 wherein a plasticiser is added to the slurry.

14. A process as claimed in claim 13 wherein the plasticiser comprises polyethylene glycol or glycerol.

15. A process as claimed in claim 1 wherein the synthetic resin comprises a fluorinated polymer such as polytetrafluoroethylene.

16. A process as claimed in claim 15 wherein the deposited coating is heated to a temperature in the range 230° C. to 260° C. to effect volatilisation of a component of the synthetic resin.

17. A process as claimed in claim 15 wherein the deposited coating is heated to a temperature in excess of 260° C. to effect partial coalescence of the synthetic material.

18. A process as claimed in claim 15 wherein the deposited coating is heated to a temperature of between 355° C. and 400° C. to achieve coalescence of the synthetic material.

19. A process as claimed in claim 1 wherein a flexible flat product of the process is bonded to one or both sides of a preformed flat product of metallic and/or non-metallic material.

20. A process for producing flat products from particulate material which comprises forming a castable slurry comprising, in a solution of water, particulate metallic and/or non-metallic material, a film-forming binder and a synthetic resin in particulate form, depositing the slurry as a coating onto a support surface and heating the deposited coating to a temperature at or in excess of that at which a component of the synthetic resin volatilises.

21. A thin flexible flat product produced in accordance with a process as claimed in claim 1.

22. A thin, flexible flat product produced in accordance with a process as claimed in claim 20.

* * * * *

UNITED STATES PATENT AND TRADEMARK OFFICE
CERTIFICATE OF CORRECTION

PATENT NO. : 4,772,322

DATED : September 20, 1988

INVENTOR(S) : John Bellis et al.

It is certified that error appears in the above-identified patent and that said Letters Patent is hereby corrected as shown below:

On the front page of the patent, please insert as Assignee:

-- [73] Assignee: Mixalloy Limited, Rhydymwyn, Mold, Clywd, Wales--.

On the front page of the patent, under the References Cited section, please delete the following reference from U.S. PATENT DOCUMENTS:

"3,702,511        11/1972         Miller. . . . . . . . . .40/306".

Column 4, line 23, delete "wqherein" and insert --wherein--.

Signed and Sealed this

Twenty-eighth Day of February, 1989

Attest:

DONALD J. QUIGG

*Attesting Officer*      *Commissioner of Patents and Trademarks*